May 9, 1933.   R. B. DE LONG   1,908,226
PROCESS OF APPLYING A METAL STRIPE TO A VEHICLE BODY

Filed Feb. 26, 1932

INVENTOR,
Robert B. De Long,
BY Howard D. Smith,
His ATTORNEY

Patented May 9, 1933

1,908,226

UNITED STATES PATENT OFFICE

ROBERT B. DE LONG, OF CLEVELAND, OHIO

PROCESS OF APPLYING A METAL STRIPE TO A VEHICLE BODY

Application filed February 26, 1932. Serial No. 595,315.

This invention relates to a new and useful process of applying a metal stripe to a vehicle body.

It is the principal object of my invention to provide a simple, easy and efficient process of applying to a metal automobile body, a metal stripe which will not rub off, or become ragged in appearance if it remains.

An ornamental metal stripe applied to an automobile body by my process will not only outlast a painted stripe, but its sharp, straight edges and very high lustre will cause it to appear attractive at all times.

Figure 4:
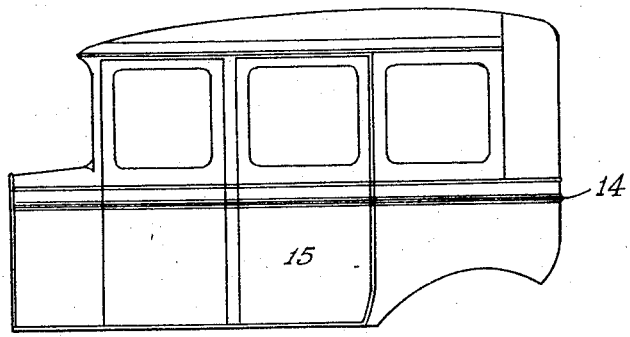
Figure 1:
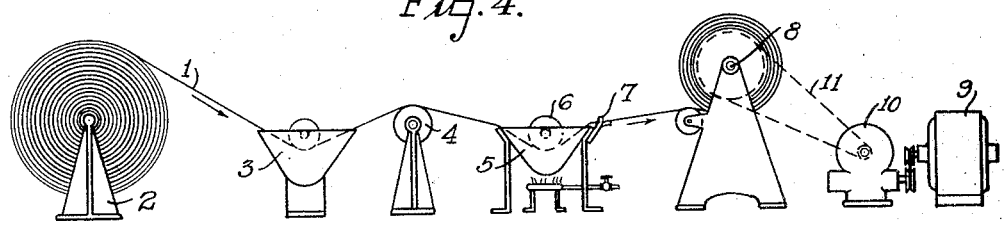
Figure 3:
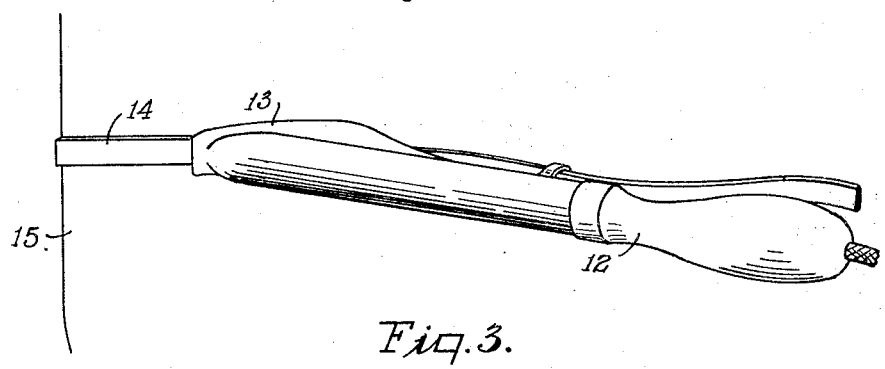
Figure 2:
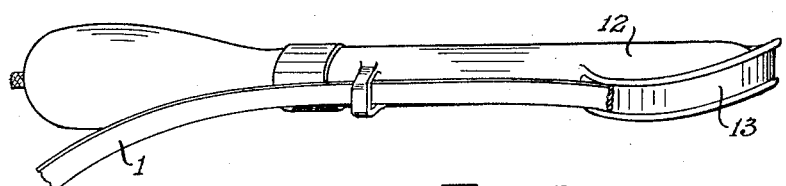

One form of means for use in practicing my method of applying a metal stripe to an automobile body, is illustrated in the accompanying drawing, of which Figure 1 is a diagrammatic view of the successive steps, and preferred means for employment therewith, in preparing the metal stripe for application to said body. Figure 2 is a perspective view of a tool that may be used in applying the prepared stripe to that body. Figure 3 is a diagrammatic view showing how the prepared stripe may be applied to the metal surface of the body. And Figure 4 is a side view of an automobile body to which a metal stripe has been applied by my process.

My process contemplates the provision of a metal strip or ribbon 1 wound on a reel 2. This strip may be of brass, german silver, stainless steel or any other suitable metal formed or rolled through a die to any desired thickness and width.

From the reel 2 the strip 1 is rolled through a vat 3 containing a soldering acid. Thence the strip is passed over an idler roller 4 to a vat 5 containing melted solder.

In order that only the required amount of solder—not too much—may be applied to the strip in this vat, I have provided therein a roller 6 under which the strip passes during its travel through the hot solder. Assisting this roller is an end member 7 comprising a piece of rubber or leather containing a square hole through which the strip is then drawn. This scrapes the excess solder off the sides and top of the strip, allowing its under side to retain as much solder as it will hold, which will be sufficient to apply the strip to the body.

The strip, prepared as just described, is then rolled into coils on a reel 8 that may be turned by an electric motor 9 through gearing 10 and a belt 11, although other suitable operating means may be provided for this purpose if desired.

For the purpose of applying the prepared strip 1 to an automobile body, a long, conventional, electrically heated soldering iron 12 having a curved channel end 13, may be used. Through this channel in the soldering iron the prepared strip 1 passes, and is therein heated for a very fast application as a stripe 14 to a metal surface such as that of an automobile body 15 in Figure 3.

After the stripe is soldered to the body, as illustrated in Figure 3, it is beveled and polished, preferably by using a disc sanding machine or file and buffing it up with a felt or soft buffing machine.

The body now being ready for painting, the paint or Duco is then applied to it and the stripe, completely covering the surface.

Since the paint has to be sanded off and rubbed up to get a smooth surface, it is desirable to sand off the top surface of the stripe first, as it is higher than the surface of the body. This completes my process of applying to the body an ornamental metal stripe that will never wear off.

Having described my invention, I claim:

1. A process of applying a metal stripe to a vehicle body, which consists first in passing a metal strip through a soldering acid, then immersing it in melted solder, and then heating the prepared strip in a soldering iron and applying it through the latter to a vehicle body.

2. A process of applying a metal stripe to a vehicle body, which consists in first passing a metal strip through a soldering acid, then immersing it in melted solder, then heating the prepared strip in a soldering iron and applying it through the latter to a vehicle body, then leveling and polishing the applied strip, then painting both the strip and the body and thereafter sanding off and rubbing up the same, first sanding off the paint on the top surface of the strip.

3. A process of applying a metal stripe to a vehicle body, which consists in first rolling a metal strip through a vat of soldering acid, then rolling said strip through a vat of melted solder and withdrawing it therefrom in contact with a flexible scraper, and then heating the prepared strip in a soldering iron and applying it through the latter to a vehicle body.

4. A process of applying a metal stripe to a vehicle body, which consists in first rolling a metal strip through a vat of soldering acid, then rolling said strip through a vat of melted solder and withdrawing it therefrom through a square hole in a flexible scraper, and then heating the prepared strip in a soldering iron and applying it through a channel end of the latter to a vehicle body.

5. A process of applying a metal stripe to a vehicle body, which consists in first rolling a metal strip through a vat of soldering acid, then rolling said strip through a vat of melted solder and withdrawing it therefrom in contact with a flexible scraper, then heating the prepared strip in a soldering iron and applying it through the latter to a vehicle body, then leveling and polishing the applied strip, then painting both the strip and the body and thereafter sanding off and rubbing up the same, first sanding off the paint on the top surface of the strip.

6. The process of applying a metal stripe to a metal surface, which consists in heating a prepared metal strip in a soldering iron and applying it through the latter to said surface.

7. The process of applying a metal stripe to a metal surface, which consists in precoating a metal strip with solder, and then heating the prepared strip in a soldering iron and applying it through the latter to said surface.

8. The process of applying a metal stripe to a metal surface, which consists in applying a solder-coated metal strip to said surface, then leveling and polishing the applied strip, then painting both the strip and the body and thereafter sanding off and rubbing up the same, first sanding off the paint on the top surface of the strip.

In testimony whereof I have hereunto set my hand this 15th day of February 1932.

ROBERT B. DE LONG.